Jan. 22, 1963 W. H. FARROW 3,074,429
PIVOTED CHECK VALVE
Filed Jan. 20, 1960
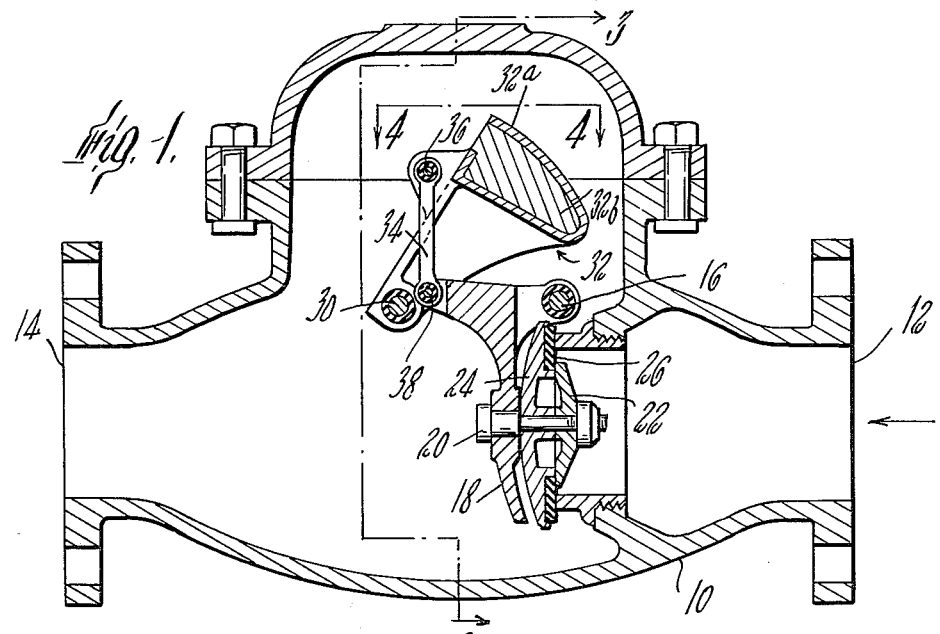
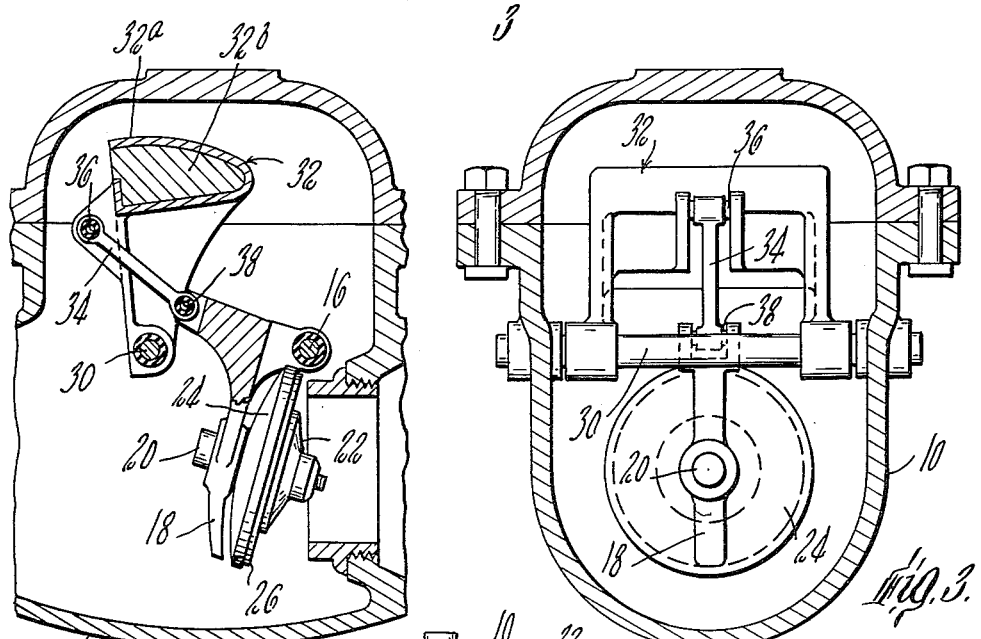
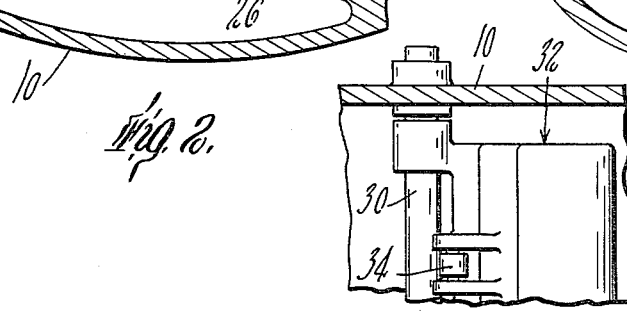

United States Patent Office 3,074,429
Patented Jan. 22, 1963

3,074,429
PIVOTED CHECK VALVE
William H. Farrow, Arlington, Mass., assignor to Hersey-Sparling Meter Company, Dedham, Mass., a corporation of Massachusetts
Filed Jan. 20, 1960, Ser. No. 3,659
3 Claims. (Cl. 137—527.8)

This invention relates to a check valve, and more particularly to such a valve in which a greater pressure differential is required to initially open the valve than to hold it open.

A primary object of the invention is to provide such a check valve in which it is possible to achieve a more rapid decrease than heretofore in the pressure differential required to bias toward further opening, relative to the amount of opening already effectuated, which provides faster opening of the check valve and thus a higher proportion of total flow therethrough when used, for instance, in a compound water meter, for which the invention is especially well suited.

A further very important object is to make this possible while at the same time materially decreasing the weight of the parts used to bias the clapper of the check valve in a closed direction, an especially significant factor in view of the very heavy parts necessary especially in the larger valves and the large quantities of metal heretofore necessary to provide the required weight.

Further objects are to avoid energy loss owing not only to heavier weights but also to friction caused by rolling contacts as in Tilden 1,725,428; to provide for opening and closing rates identical for any particular pressure differentials and flow rates; to provide a valve requiring smaller housing room to accomplish a particular purpose; to make possible replacing old check valve assemblies in existing compound water meters without making necessary the replacing of other parts of the latter; and to provide simplified insurance against uncontrolled overbalancing of the counterweight (movement of the center of gravity thereof past the vertical plane through the pivotal axis thereof).

An important feature of the invention is provision of a linkage positively interconnecting the clapper carrier and the counterweight. This linkage interconnection makes possible bringing the point at which weight is exerted on the carrier (or clapper arm) nearer the axis about which the counterweight is pivoted and further from the axis about which the carrier is pivoted, both of which enable a lighter counterweight to accomplish a greater effect. This linkage arrangement also makes possible a counterweight motion through a greater angle when the clapper is swung through a particular angle, providing more rapid opening and greater rate of pressure drop decrease through the valve with increased angular movement of the carrier.

Other objects, advantages and features will appear from the following description of a preferred embodiment of the invention, taken together with the attached drawings, in which:

FIG. 1 is a sectional view from the side showing the valve in closed position, and taken on a vertical plane through the center line of said embodiment;

FIG. 2 is a partial view corresponding to FIG. 1, showing the valve in partially open position;

FIG. 3 is a sectional view taken at 3—3 of FIG. 1; and

FIG. 4 is a partial sectional view taken at 4—4 of FIG. 1.

Referring now to the drawings, there is shown a housing 10 with an upstream inlet 12 and a downstream outlet 14. Pivotally mounted on a pin 16 with its ends supported in said housing is a carrier 18 to which is secured by fastener 20 and disk 22 a closure clapper 24 with elastomer washer 26.

Pivotally mounted on a pin 30 with its ends also supported in said housing is a counterweight 32 comprising brass shell 32a and lead filling 32b.

The counterweight 32 and carrier 18 are positively interconnected by means of link 34, which is pivotally secured at its upper end by pin 36 to an upper portion of said counterweight, above and forward (downstream) of the center of gravity thereof; and pivotally secured at its lower end by pin 38 to an upper, downstream portion of said carrier.

In the preferred embodiment, the two link pins 36 and 38 have their axes in the same vertical plane when the valve is closed, and the center of gravity of the counterweight 32 is near that same plane when the valve is open, to minimize pressure drop thereacross. The pins 36 and 38, as well as 16 and 30, may suitably be surrounded by hard rubber bushings.

The check valve of the invention may advantageously be used in a compound water meter, in which the valve remains closed to divert low rates of flow through a small metering device in which they can be accurately registered; and is caused to open when demand for high rates of flow imposes an increased differential pressure on the valve. When the valve opens at a predetermined differential pressure (for example, 4 p.s.i.) high rates of flow are measured by a full-sized metering device. However, as the check valve swings open, the force required to hold its position or even open it further decreases with new and advantageous rapidity, to minimize friction losses. The difference in the number of total pounds of force required to maintain a typical prior art 3″ roller type valve at various degrees of opening and that required to maintain a 3″ valve according to the invention in corresponding positions is striking:

| Degree Opened | Prior Art | Invention |
|---|---|---|
| 2 | 25.8 | 23.2 |
| 4 | 21.4 | 16.9 |
| 6 | 17.7 | 13.2 |
| 8 | 14.4 | 9.5 |
| 10 | 11.2 | 5.8 |
| 12 | 8.4 | 2.6 |

Furthermore, the invention makes possible not only this important saving in energy loss in use, but requires a much less heavy counterweight and carrier, with important savings in metal. Formerly a total weight (counterweight plus carrier) of 22 pounds 14 ounces was required; the invention makes possible reduction of this weight to 9 pounds 15 ounces.

Furthermore, the invention makes possible obtaining all the advantages and desirable objects above referred to.

If desired, the axis of the pin about which the carrier is pivoted to the link (and also, if desired, the axis of the pin about which the link is pivotally joined to the counterweight) may be downstream of the axis of the pin about which the counterweight is pivoted in the housing.

Other embodiments of the invention will occur to those skilled in the art, and are covered by the following claims.

I claim:

1. A check valve comprising a housing with an upstream inlet defined by a valve seat and a downstream outlet, an upstream and a downstream bearing mounted in said housing and extending crosswise thereof at spaced locations above said inlet, a clapper for movement against said valve seat to close the same, a carrier with a depending arm secured to said clapper for moving the same and with forwardly and rearwardly extending arms there-above, said rearwardly extending arm being mounted for pivotal movement on said upstream bearing, a unitary weight with a depending arm pivotally secured toward the lower end thereof on said downstream bearing and with its center of gravity in closed position upstream of said downstream bearing and generally above said carrier, and a link positively interconnecting said carrier and said weight, said link being pivotally secured at a lower end to said forwardly extending arm of said carrier and being pivotally secured at an upper end to said weight, at a location above and forward of the center of gravity thereof.

2. A check valve comprising a housing with an upstream inlet defined by a valve seat and a downstream outlet, a clapper carrier pivotally secured in said housing, a clapper carried by said clapper carrier for movement against said valve seat, a unitary counterweight pivotally secured in said housing downstream of where said carrier is secured, and a link positively interconnecting said clapper carrier and said counterweight, said link being pivotally mounted at its upper end relative to said counterweight and about an axis downstream of the center of gravity of said counterweight and above the axis of rotation of said counterweight, said link being pivotally mounted at its lower end in an upper, downstream portion of said clapper carrier, said link being vertical when said valve is in closed position.

3. A check valve comprising a housing with an upstream inlet defined by a valve seat and a downstream outlet, a clapper carrier pivotally secured in said housing, a clapper carried by said clapper carrier for movement against said valve seat, a weight pivotally secured in said housing, downstream of where said carrier is secured, and a link pivotally secured at its upper end to said weight and at its lower end to said clapper carrier, the center of gravity of said weight being at a fixed distance from the axis about which said weight pivots and the bottom of said link being, when the valve is in closed position, closer in a stream direction to said axis than to said center of gravity, said center of gravity describing an arc in a downstream direction from a point upstream of said axis as said valve moves from closed to open position, and as the valve opens said bottom and said center of gravity approaching each other in a stream direction whereby said valve requires a large pressure to open it, but the pressure drop thereacross diminishes with great rapidity as the valve opens.

References Cited in the file of this patent

UNITED STATES PATENTS

| | | |
|---|---|---|
| 775,670 | Cozzens | Nov. 22, 1904 |
| 1,057,721 | Freeman | Apr. 1, 1913 |
| 1,720,444 | Rowley | July 9, 1929 |